(12) United States Patent
Sternby et al.

(10) Patent No.: US 11,838,308 B2
(45) Date of Patent: *Dec. 5, 2023

(54) COMPUTER-IMPLEMENTED METHOD AND ARRANGEMENT FOR CLASSIFYING ANOMALIES

(71) Applicant: Telefonaktiebolaget LM Ericsson (publ), Stockholm (SE)

(72) Inventors: Jakob Sternby, Lund (SE); Michael Liljenstam, Sunnyvale, CA (US); Erik Thormarker, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,465

(22) Filed: Sep. 28, 2022

(65) Prior Publication Data

US 2023/0029134 A1 Jan. 26, 2023

Related U.S. Application Data

(63) Continuation of application No. 16/697,749, filed on Nov. 27, 2019, now Pat. No. 11,582,249.

(51) Int. Cl.
*H04L 9/40* (2022.01)
*H04L 43/08* (2022.01)
(Continued)

(52) U.S. Cl.
CPC .......... *H04L 63/1425* (2013.01); *G06N 5/01* (2023.01); *G06N 5/04* (2013.01); *G06N 20/00* (2019.01);
(Continued)

(58) Field of Classification Search
CPC ............... H04L 63/1425; H04L 43/08; H04L 63/1416; H04L 41/16; H04L 41/142;
(Continued)

(56) References Cited

U.S. PATENT DOCUMENTS 10,045,218 B1 * 8/2018 Stapleton .......... G06N 5/01
10,237,289 B2    3/2019 Du
(Continued)

FOREIGN PATENT DOCUMENTS

CN    105471882 A    4/2016
CN    108989075 A    12/2018
(Continued)

OTHER PUBLICATIONS

Liu, Fei Tony et al., "Isolation Forest", 2008 Eighth IEEE International Conference on Data Mining, 2008 IEEE, pp. 413-422.
Data Science Stack Exchange, "Isolation Forest Feature Importance", https://datascience.stackexchange.com/questions/34115/isolation-forest-feature-importance , Jul. 6, 2018, 2 pages.
(Continued)

*Primary Examiner* — Beemnet W Dada
(74) *Attorney, Agent, or Firm* — LEFFLER INTELLECTUAL PROPERTY LAW, PLLC

(57) ABSTRACT

The present disclosure relates to a computer-implemented method and an apparatus for classifying anomalies of one or more feature-associated anomalies in network data traffic between devices in a first part of a network and devices in a second part of the network. The method comprises retrieving at least one network data traffic sample and determining one or more feature-associated anomaly scores for the retrieved at least one network data traffic sample. The method further comprises determining feature importance of each feature of a feature-associated anomaly score and classifying one or more anomalies based on the determined one or more feature-associated anomaly scores and the determined feature importance.

14 Claims, 3 Drawing Sheets

(51) Int. Cl.
  *G06N 5/04*     (2023.01)
  *G06N 5/01*     (2023.01)
  *G06N 20/00*    (2019.01)

(52) U.S. Cl.
  CPC .......... *H04L 43/08* (2013.01); *H04L 63/1416* (2013.01)

(58) Field of Classification Search
  CPC ............ G06N 5/01; G06N 5/04; G06N 20/00; G06N 20/20
  See application file for complete search history.

(56) References Cited

U.S. PATENT DOCUMENTS

| | | |
|---|---|---|
| 2019/0087737 A1 | 3/2019 | Pendar et al. |
| 2020/0213343 A1 | 7/2020 | Bharrat et al. |

FOREIGN PATENT DOCUMENTS

| | | |
|---|---|---|
| CN | 109873812 A | 6/2019 |
| EP | 3451219 A1 | 3/2019 |
| WO | 0007312 A1 | 2/2000 |

OTHER PUBLICATIONS

Data Science Stack Exchange, "Multivariate outlier detection with isolation forest. How to detect most effective features?", https://datascience.stackexchange.com/questions/30693/multivariate-outlier-detection-with-isolation-forest-how-to-detect-most-effecti, Apr. 23, 2018, 3 pages.

Liu FT, Ting KM, Zhou ZH, "Isolation-based anomaly detection", ACM Transactions on Knowledge Discovery from Data (TKDD). Mar. 1, 2012;6(1):1-39, https://cs.nju.edu.cn/zhouzh/zhouzh.files/publication/tkdd11.pdf, 44 pages.

Breunig M, et. al., "LOF: identifying density-based local outliers", ACM sigmod record, vol. 29. No. 2. ACM, 2000, https://www.researchgate.net/profile/Raymond_Ng3/publication/221214719_LOF_Identifying_Density-Based_Local_Outliers/links/0046353398a998a66c000000/LOF-Identifying-Density-Based-Local-Outliers.pdf, pp. 93-104.

Carletti et. al., "Explainable Machine Learning in Industry 4.0: Evaluating Feature Importance in Anomaly Detection to Enable Root Cause Analysis", http://automatica.dei.unipd.it/tl_files/utenti2/susto/publications/SMC_2019.pdf, 6 pages.

PCT International Search Report, dated Sep. 28, 2021, in connection with International Application No. PCT/EP2021/051890, all pages.

PCT Written Opinion, dated Sep. 28, 2021, in connection with International Application No. PCT/EP2021/051890, all pages.

Bangladesh Examination Report dated Dec. 26, 2021 in connection with Bangladesh Application No. 316/2020/9481, 1 page.

\* cited by examiner

COMPUTER-IMPLEMENTED METHOD AND ARRANGEMENT FOR CLASSIFYING ANOMALIES

CROSS-REFERENCE TO RELATED APPLICATIONS

This application claims the benefit of U.S. application Ser. No. 16/697,749, filed Nov. 27, 2019, which is hereby incorporated herein by reference in its entirety.

The present disclosure relates to a computer-implemented method and an apparatus for classifying anomalies of one or more feature-associated anomalies in network data traffic.

BACKGROUND

In network management, it is difficult to detect network behaviour, e.g., malicious network behaviour, in a manner sufficiently comprehensive to be able to handle complex network and system aspects. Algorithms are presently being developed and investigated to improve network management.

Network and system can be monitored by applying detection models that comprise a population of detection trees, e.g., as proposed by the "isolation Forest" algorithm or the recently developed algorithm "Anomaly Detection Forest". Such models are constructed (trained) by fitting the trees to a number of training observations.

The different forest algorithms provide outlier or anomaly detection, and like in other anomaly detection methods an anomaly score that represents the degree of anomaly for a given sample may be defined. In forest algorithms, the anomaly score may be computed by evaluating a mean path length of an observation in the plurality of detection trees. The forest algorithms provide no simple interpretation of the result, nor of the importance of the various features of the observation that is a sample of network data traffic.

In many cases, more information as to what caused the anomaly detection method to produce a high anomaly score value for a given sample would be helpful. Consequently, there is a need for a solution to facilitate anomaly analysis from anomaly detection using models that comprise a population of detection trees.

SUMMARY

It is an object of the present disclosure to solve or mitigate, alleviate, or eliminate at least some of the above-mentioned deficiencies, disadvantages, and drawbacks of the background art solutions.

According to a first aspect, the object of the disclosure is achieved by a computer-implemented method for classifying anomalies of one or more feature-associated anomalies in network data traffic between devices in a first part of a network and devices in a second part of the network. The method comprises retrieving at least one network data traffic sample and determining one or more feature-associated anomaly scores for the retrieved at least one network data traffic sample. The method further comprises determining feature importance of each feature of a feature-associated anomaly score and classifying one or more anomalies based on the determined one or more feature-associated anomaly scores and the determined feature importance.

In some embodiments, at least one feature is representative of inbound and/or outbound traffic between devices in the first part of the network and devices in the second part of the network.

According to a second aspect, the object of the disclosure is achieved by a computer program product comprising a non-transitory computer readable medium, having thereon a computer program comprising program instructions. The computer program is loadable into a data processing unit and configured to cause execution of the method according to the first aspect, when the computer program is run by the data processing unit According to a third aspect, the object of the disclosure is achieved by an apparatus for classifying anomalies in network data traffic between devices in a first part of a network and devices in a second part of the network. The apparatus comprises processing circuitry configured to cause retrieval of at least one network data traffic sample. The processing circuitry is further configured to cause determination of one or more feature-associated anomaly scores and determination of feature importance for each feature of a feature-associated anomaly score followed by classification of one or more anomalies based on the determined one or more feature-associated anomaly scores and the determined feature importance.

The proposed solution provides a model-based approach for feature importance evaluation that enables automated analysis into the outcome provided by a forest algorithm. This is achieved by a stable and clear way of classifying detected anomalies, e.g. in a sorted list of features sorted by how much each feature contributed to the high anomaly score. Applied to network data traffic analysis, the proposed solution facilitates automated anomaly analysis using the classifying of detected anomalies.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating example embodiments.

DETAILED DESCRIPTION

Figure 1:
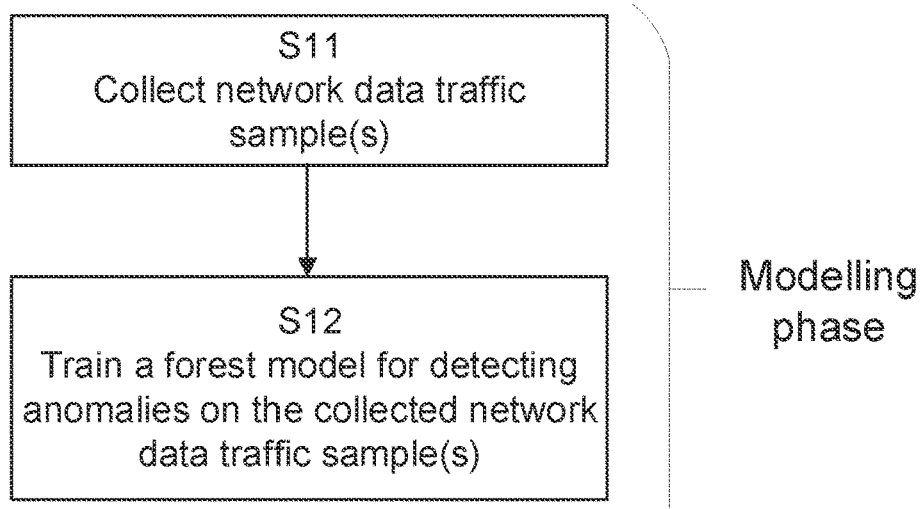
FIG. 1 shows a flowchart representation of a forest modelling phase.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout the disclosure.

It should be emphasized that the term "comprises comprising", when used in this specification, is taken to specify the presence of stated features, integers, steps or components, but does not preclude the presence or addition or one or more other features, integers, steps, components or groups thereof. As used herein, the singular forms "a", "an", and "the" are intended to comprise the plural forms as well, unless the context clearly indicates otherwise.

When an arrangement is referred to herein, it is to be understood as a physical product or apparatus that may comprise one or more parts, such as processing circuitry in the form of one or more processors, one or more controllers, or the like.

In the context of the present disclosure, the terms "network traffic data", "traffic data", or "data" are used interchangeably, and refer to data with network flow properties, e.g., data from which mean/min/max of inbound and outbound data volumes as well as number of inbound and outbound connections and used ports may be extracted and used as features. The features may be aggregated using time windows so that each data point corresponds to a window in time. The network traffic data may be communicated between devices in a first part of a network and devices in a second part of the network. In the context of the present disclosure, it is to be understood that the first and second part may belong to the same network, e.g. a network under single operator control; but it is equally possible that the first and second part refer to different operator networks in an overall 3GPP network context, or any other type of network partitions that may be envisioned in a network capable of supporting network data traffic.

Anomaly detection represents the problem of finding anomalies in a data set. One way to construct a system for detecting anomalies, e.g., anomalies due to deliberate disturbing activities in a network data traffic scenario, is to model normal behavior together with a function that describes how well a new instance fits to the existing modelling. Anomaly detection, also known as outlier detection or novelty detection, may be done using models that comprise a population of detection trees, in the following denominated forest algorithms. The detection implies the identification of rare items, events or observations, which raise suspicions by differing significantly from the majority of the data. In the context of this disclosure, such anomalous items will translate to malicious data or other data deficiencies in network data traffic. During model training, iterative methods are used to define a plurality of tree-like decision models. A predictive output may be determined by computing an anomaly score, i.e., a quantitative indicator of the extent to which a sample is anomalous or unusual. The anomaly score may be computed from a mean path length in the decision tree models. Anomalies or outliers are considered as exceptions or oddities that do not conform to a normal or expected set of data.

Turning to the Isolation Forest, IF, algorithm, this is an example of unsupervised learning wherein several detection trees, known as isolation trees, are generated. The IF algorithm creates isolation leaves based on training data which may contain a mixture of normal and anomalous data or just normal data Thus, when using the Isolation Forest algorithm, the construction of the isolation forest searches for anomalies within a training set. Each isolation tree is a decision tree fit to a training set, i.e., data sample, of random training data. Each tree is fit to the training set by successive random selection of a feature along with a split value. The split value is used to subdivide the training set into two child trees emanating from nodes in the isolation tree. This process continues recursively until only one sample is left to construct a tree from—in which case the process stops, and the resulting endpoint is a leaf of the isolation tree.

In the recently developed Anomaly Detection Forest algorithm, decision trees are fit to training data similarly to what is proposed in the isolation Forest algorithm, but the algorithm aims at maximizing the normality of training data whilst creating possible isolations for unseen data at the same time. Therefore, the ADF has a greater capability of producing high anomaly scores for anomalies that are completely outside of the interval of feature values processed in respective tree nodes.

Turning to the output from the above reflected forest algorithms, the output is an anomaly score that implies that a given sample is an anomaly but without providing further motivation or classification of the impact of the anomaly. In many cases, an anomaly score will trigger an alarm that in turn will require manual inspection by an analyst, and if the feature space of the samples is high dimensional, it may be difficult to see why a particular sample was flagged as an anomaly. Thus, there is a need to determine the importance of the feature values of the sample that caused the model to produce a high anomaly-score.

The present disclosure proposes classification of anomalies and/or features for anomaly detection models using a forest of detection trees. The weight for each detection tree is determined by the path length of the anomaly in the detection tree and by the usage of the feature on at path. The features may be sorted according to importance, e.g., by sorting the features according to the magnitude of the sum.

In its most general form, the present disclosure proposes a computer-implemented method for classifying anomalies of one or more feature-associated anomalies in network data traffic between devices in a first part of a network and devices in a second part of the network. The method comprises retrieving S21 at least one network data traffic sample and determining S23 one or more feature-associated anomaly scores. Feature importance is determined S24 for each feature of a feature-associated anomaly score, whereupon one or more anomalies are classified based on the determined one or more feature-associated anomaly scores and the determined feature importance.

Thus the proposed method provides feature importance related to each anomaly and each feature. This provides a stable and clear way of retrieving a sorted list of features for each detected anomaly sorted by how much the features contributed to the high anomaly score.

This additional information, complementary to the anomaly score, can be used by a system or system analyst of network data traffic to perform various operations, including but not limited to:
- more efficiently deciding if an alarm is a true indication of malicious behavior or not;
- after several false alarms with the same "important" features, automatically decide to increase the threshold for those particular anomalies;
- automatically decide/suggest upon an action based on the features that caused the anomaly, for instance limiting a certain type of traffic, limiting the use of certain ports etc.;
- automatically decide to update the models based on certain features continuously providing false alarms;
- automatically group anomalies based on similarities in their feature importance scores; grouping can be done through e.g. explicit algorithms or clustering algorithms;
- automatically, based on a certain feature being ranked as having high importance for an alert, trigger collection of further data such as node logs, packet traffic tracing, or similar as additional evidence to aid investigation of the cause of the alert.

In some examples, at least one feature may be representative of inbound and/or outbound traffic between devices in the first part of the network and devices in the second part of the network, e.g., mean/min/max of inbound and outbound data volumes, number of inbound and/or outbound connections, and used ports.

FIG. 1 shows a flowchart representation of a modelling phase for creating a model that comprise a population of detection trees. Training of the model comprises collecting S11 feature samples of network data traffic at a monitoring point between a first and a second part of a network, and training S12 the model for detecting anomalies on the collected feature samples. The feature samples are collected from network data traffic between devices in the first part of a network and devices in the second part of the network, e.g., between internal network devices and external network devices, or between internal network devices. The network flows may originate from different device types such as IoT devices, computers, mobile phones or network equipment. Thus, network data traffic is exchanged in a physical layer between the first and second part of the network, e.g., over a radio interface in a wireless network. The model is trained to detect anomalies in a mixed set of categorical, discrete and continuous features of single and/or aggregated network flows or packets.

Figure 2:
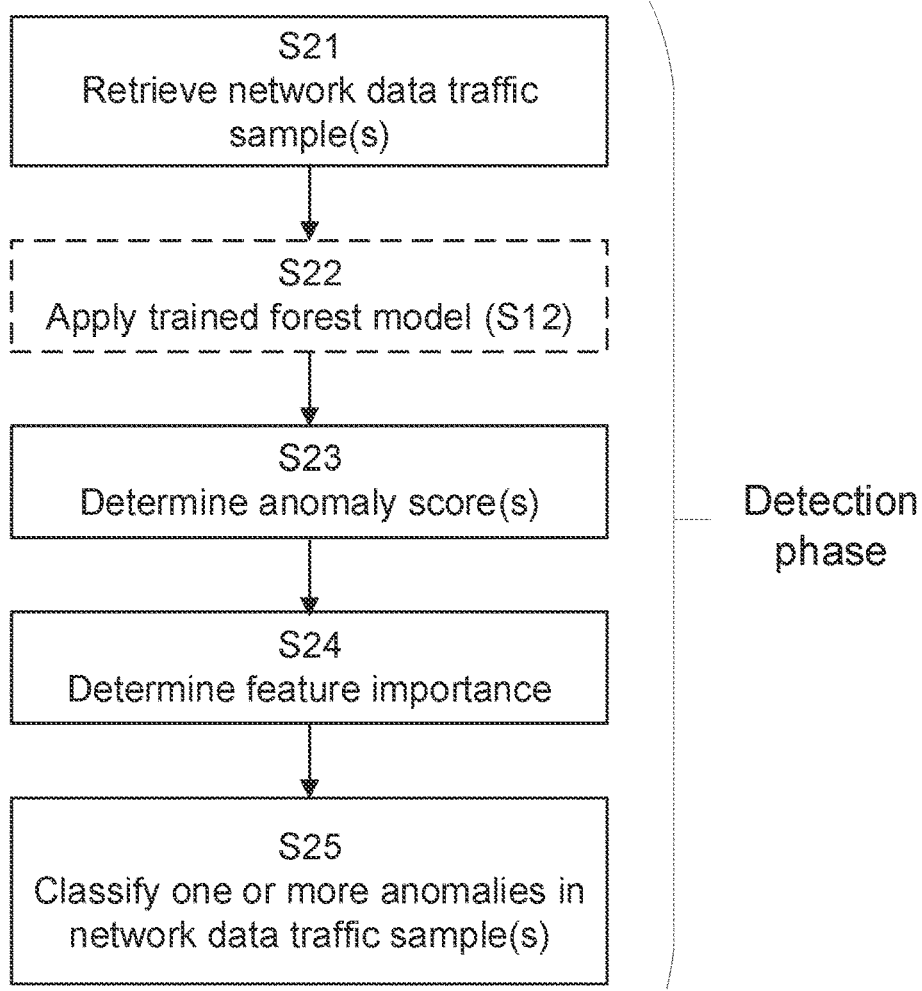
FIG. 2 shows a flowchart representation of a method for anomaly detection using the forest model.

FIG. 2 shows a flowchart representation of a method for anomaly detection using the forest model of FIG. 1, i.e., a computer-implemented method for detecting anomalies in network data traffic between devices in a first part of a network and devices in the second part of the network. The forest algorithms are trained for detecting anomalies on the collected feature samples using a plurality of detection trees. The computer-implemented method comprises retrieving S21 at least one network data traffic sample, i.e., a sample of data traffic between devices in the first part of the network and devices in the second part of the network. The method further comprises determining S23 an anomaly score, e.g., applying S22 a model trained according to the method described with reference to FIG. 1.

The anomaly score may be determined from a mean path length in the decision tree models. Anomalies in the network data traffic sample are classified S25 based on the determined anomaly score and a determined feature importance that is determined S24 for each feature of a feature-associated anomaly score. The anomaly detection method produces an anomaly score that may be based on the abovementioned mixed set of categorical, discrete and continuous features of single and/or aggregated network flows or packets. The node implementing this method can then raise an alarm for any score above a certain threshold.

In the prior art, an alarm reflects only the anomaly score and does not provide any further information as to why a certain data point was considered anomalous. However, further information pointing to the deciding factors for issuing an alarm would be very effective to reduce time for analysis and automate the analysis.

The present disclosure solves this problem by specifying a method for obtaining an ordered list of the most important features inducing a high anomaly-score from the model for a certain data point. In some examples, the classifying comprises ranking the one or more anomalies in relation to one another, e.g., in the ordered list, based on a combination of anomaly score and feature importance that may be obtained by adding an anomaly score value and a feature importance value.

In some examples, the feature-associated anomalies are determined by applying S22 a forest model comprising a collection of detection trees, e.g., an Isolation Forest, IF, model or an Anomaly Detection Forest, ADF, model.

In some examples, the disclosed method further comprises activating an alarm based on a comparison between the determined anomaly score and a predetermined anomaly score threshold. In complimentary examples, the method comprises activating the alarm when the feature importance surpasses a predetermined feature importance value.

In some examples, the disclosed method further comprises activating at least one feature related limitation in the first part and/or second part of the network based on feature importance, wherein activating the at least one feature related limitation comprises limiting inbound and/or outbound traffic; limiting a number of inbound and/or outbound connections; and limiting use of ports. Thus, the proposed method enables automated network control of network data traffic between a first part of a network and a second part of a network using the anomaly classification.

The present invention proposes classification of anomalies and/or features for anomaly detection models using a forest of detection trees. The feature importance, for each anomaly and each feature, may be determined as a weighted sum over all detection trees in the forest. The weight for each detection tree is determined by the path length of the anomaly in the detection tree and by the usage of the feature on that path. The features are sorted according to importance by sorting the features according to the magnitude of the sum.

Thus, the feature importance $I(x,f)$ for a feature f of a sample x for an anomaly detection model that consists of a forest T of detection trees $T_1, \ldots, T_N$ may be based on a tree specific weight determined by the path length of the sample in the tree, a detection tree weight that is dependent on how the feature is used on a path followed by the sample in a specific detection tree, and a normalization constant as indicated in the equation [Equation 1] below.

$$I(x, f) = \frac{1}{M(x, T)} \sum_{k=1}^{N} w_k c_k(x, f) \qquad \text{[Equation 1]}$$

$w_k$ is a tree specific weight that is higher when x has a shorter path in the tree $T_k$. $c_k(x,f)$ is a detection tree weight that depends on $T_k$, the feature f and sample x and which is higher the more f is used on the path that x follows in $T_k$. $M(x,T)$ is a normalization constant based on sample x and forest T.

Feature importance calculation will now be further explained and instantiated for respective scenarios of applying the Isolation Forest algorithm and the Anomaly Detection Forest algorithm, wherein the algorithm for determining the feature importance is commonly applied to the respective scenarios, while the normalization constant $M(x, T)$ and the detection tree weights $c_k(x,f)$ and $w_k(x,f)$ are in part adapted to the applied forest algorithm.

Feature Importance Calculation in Isolation Forest, IF, Scenario

During a training phase of the Isolation Forest algorithm, a forest of detection trees, so-called isolation trees, are built from a training set comprising random training data. At each node in an isolation tree, a feature is chosen at random and a split value is chosen in the range between the minimum and maximum values of the samples present in the node. The node is then split on the value by sending all samples that have feature value less than the split value to a first child node and the other samples in the node to a second child node i.e., a left and right node in a tree structure presentation. Starting from a root node, the splitting process continues until either all the samples in the current node are identical (typically this means that the node consists of a single sample), or the number of edges from the root node to the current node is equal to a fixed height limit.

During the prediction phase an anomaly score is decided for a sample x. The prediction of the anomaly score comprises, in each tree, determining the path from the root node to a leaf, decided by the split values in the tree and the feature values of sample x. If sample x has a short path in an isolation tree $T_k$ of the forest T, it means that the sample x has feature values corresponding to a significant isolation in the training subset used to build $T_k$. Thus sample x can be said to be isolated with respect to $T_k$.

The feature importance I(x,f), is determined for a feature f of a sample x, applying the above disclosed general method but using forest algorithm configured instantiations. The feature importance is based on a tree specific weight $w_k$, an isolation tree weight $c_k(x,f)$, that is dependent on feature use on a path followed by the sample in a specific isolation tree, and a normalization constant M(x,T) e.g., as indicated in [Equation 1]; the normalization constant M(x,T), the tree specific weight $w_k$ and, the isolation tree weight $c_k(x,f)$ represented by instantiations specific for the Isolation Forest algorithm.

The normalization constant M(x,T) is a weighted sum of the isolation tree weights $c_k(x,f)$, using a tree specific weight $w_k$ as weighting factor as indicated in the equation [Equation 2] below.

$$M(x, T) = \max_i \sum_{k=1}^{N} w_k c_k(x, f_i) \quad \text{[Equation 2]}$$

The tree specific weight $w_k$ may be defined as:
$w_k =$
1/PathLength(x,Tk) if (x is isolated in Tk)
0 else
The isolation tree weight $c_k(x,f)$ may be defined as:
Let j be the index of feature f.
Define $c_k$ as:

$$c_k(x, f) = \sum_{i=1}^{length(P_k)} d_i \quad \text{[Equation 3]}$$

$$\text{where } d_i = \begin{cases} 0 \text{ if } P_k[i] != j \\ 1 \text{ elif } (length(P_k) == 1) \\ 1/2 \text{ elif } (i == length(P_k)) \\ 1/(2 \cdot (length(P_k) - 1)) \text{ else.} \end{cases}$$

$P_k$ is a list (indexable by [i]) of the feature index split on in each node with children on the path that x follows in $T_k$ (ordered with the root node at $P_k[1]$) during the prediction phase. Length ($P_k$) is a number of items in list $P_k$. $Node_k$ is the final node where x ends up when following its path in $T_k$ during the prediction phase. $Dist_k$ is the number of edges from the root node of $T_k$ to $node_k$. $Size_k$ is the number of samples in $node_k$. PathLength(x,$T_k$) is $dist_k$+c($size_k$), wherein c($size_k$) is a normalization factor as identified in [7]. $d_i$ is 0 unless split on feature with index j, and, weighted otherwise depending on whether the correct split occurs in the last node on the path or not. If the split occurred in the last node, the contribution to the isolation is a certainty whereas uncertainty whether it contributed to isolation otherwise is addressed by the last weighting.

Feature Importance I(x,f) for a feature f of a sample x for an Isolation Forest model that consists of a forest T of isolation trees $T_1, \ldots, T_N$ is determined as indicated above [Equation 1] and may be output in a sorted list of feature importance for each feature. Feature importance may also be visualized as a plot indicating the single or multiple most important features for the anomaly and random subset of the samples used during the training phase.

A possible second instantiation for IF is the same as above except that $$d_i = \begin{cases} 1/\text{length}(P_k), \text{ if } (P_k[i] == j)(\text{that is, if we're splitting on feature } f)_= \\ 0, \text{ else} \end{cases}$$

The second instantiation has the advantage of being simpler than the first instantiation while providing essentially the same performance.

A possible third instantiation for IF is the same as the first instantiation except that $$d_i = \begin{cases} 1 - \text{ratio}_i, \text{ if } (P_k[i] == j)(\text{that is, if we're splitting on feature } f) \\ 0, \text{ else} \end{cases}$$

$Ratio_i$ is the number of samples in the (i+1)-th node (the 0-th node being the root node) on the path that x follows in $T_k$ divided by the number of samples in the i-th node on the path that x follows in $T_k$.

The third instantiation has the advantage of taking into account how much each node on the path that x follows in $T_k$ contributes to isolating x by removing other samples from the path.

Feature Importance Calculation in Anomaly Detection Forest, ADF, Scenario

The ADF consists of several random decision trees, called Anomaly Detection Trees, each trained by a random partition of the complete set of training instances. During training, each such tree further subdivides its associated partition by randomly selecting feature and split-value pairs for each node in the tree. The ADF may choose split-values outside the range of values for the given feature in a node, and, in this case, an empty leaf is created. Each bottom node in a tree in ADF can be seen as a subspace defined by the split-values on the path from the root. Histograms of values for all features in all such subspaces can be seen as a density model for the normality in the model. The higher count for a particular value—the more normal it is according to the model. This way density plots for normality according to the model can be plotted.

The ADF algorithm aims at maximizing the normality of training (seen) data whilst creating possible isolations for unseen data at the same time. Values for splitting a subsample at a subspace selection node are chosen from within an interval of the feature samples; for the anomaly-catching nodes the splitting value can also be chosen from outside this interval. The value space of every feature is defined as the theoretical bounds for a feature, i.e., the interval of possible values for the feature:

$$V(f) = \{x_f | x \in X\} \quad [1]$$

where X is the true sample distribution. Typically, the V(f) can be {0, 1} for binary features or $N_0$ for natural numbers including 0 or any floating point number for continuous features.

In some embodiments, the random value (γ) for splitting the feature sample, subsample (S), with feature f with value space V(f), is picked from the interval such that the resulting two children nodes are within a certain size constraint E.

$$\gamma(S)_f \in \left[ \gamma \in V(f) \text{ s.t.} \left| \frac{\#\{x_f < \gamma \mid x \in S\}}{\#S} - 0,5 \right| < \varepsilon \right] \quad [2]$$

Consequently, during modelling, the subsample of a subspace selection node is arranged to be split evenly within an ε-margin. With ε approaching 0.5 the selection criterion is identical to a node in an isolation tree, i.e., a subspace selection node and no consideration is taken to resulting sizes. Thus, each subspace selection node may be arranged to bisect the set of feature samples reaching the subspace selection node into two immediately following subspace selection nodes, when the size of the set of feature samples reaching the subspace selection node is on or above the predetermined threshold.

Aiming to avoid isolation of the subsamples, a subspace selection node is bisected to a subspace selection node and an anomaly-catching node when the number of feature samples, i.e., the subset of the collected feature samples, passed to the anomaly-catching node is smaller than a determined threshold β, of the collected feature samples. The resulting node after bisecting a subspace selection node is designated to be an anomaly-catching node when the number of feature samples, i.e., the subset of collected feature samples passed to the node is smaller than the determined threshold β. The predetermined threshold may be set as an isolation level, a fraction determined from the number of samples used to build the tree. The ε is a parameter regulating the balance of number of samples passed to each child of a subspace selection node and a smaller value of ε causes the bisected nodes to attain the critical size for becoming anomaly catching nodes at around the same depth. In the extreme case when ε is zero, every node is split evenly until the subsample size reaches β. However, with ε>0, this size will be reached after a varying number of steps of splitting.

In the anomaly-catching node the splitting value a is randomly chosen outside the value span $$\text{span}(S)_f = [\min(x_f), \max(x_f)]|_{x \in S} \quad [3]$$

of the chosen feature f for the sample set S in the node as:

$$\alpha(S)_f \in [\alpha \in V(f) \mid \alpha \notin \text{span}(S)_f] \quad [4]$$

V(f) may be updated for every parent node, i.e., subspace selection node, that splits on feature f.

The random choice of a splitting value outside the value span implies passing the subset of the collected feature samples to one side, e.g., to a subspace selection node, and creating an anomaly-catching node that may be terminated as an empty leave, i.e., terminating node, in the tree structure.

In some embodiments, each anomaly-catching node is followed by one or more further anomaly-catching nodes until reaching the AD tree depth limit D. The anomaly-catching nodes do not reduce the sample size, so for the tree creation process to terminate when stacking such, a depth limit D is imposed when constructing the tree.

A suitable depth limit D for this setup with subsample size n is:

$$D = \text{round}(4 \cdot \max([1, \log(n) - \log(\beta)])) \quad [5]$$

During the training phase, the collected feature samples (training set) are collected under normal circumstances (without malicious activity). Thus, the step of collecting feature samples is performed under anomaly transparent conditions where anomalies may be modelled from samples of network data traffic between devices in the first part of the network and the second part of the network using clean data or with normal data interspersed with a subset of anomalies that are known a priori.

These samples are then used to train an Anomaly Detection Forest, ADF in a modelling phase as illustrated in FIG. 1. The hyper-parameters needed to be chosen for this training is the collected feature samples, subsample size n. In addition to the subsample size n for creating each Anomaly Detection Tree, the number of trees T must be chosen. For large datasets, such as network data, subsample size can be set to 256 and number of trees to 100. But for some datasets a small subsample size of 16 may also be sufficient. The order of subset selection nodes and anomaly-catching nodes also needs to be selected as well as the depth limit D and the hyper-parameters ε and β described above. It is also possible to use an ensemble forest of trees initialized with different hyper-parameters.

After the Anomaly Detection Forest, ADF has been created in the modelling phase, the threshold value for detecting anomalies can be chosen as the minimal value achieving the expected false positive ratio on the samples used for modelling or according to previously observed limits for abnormality as described below.

During a detection phase, e.g., as illustrated in FIG. 2, an anomaly score is determined. Applying the forest model determined during the modelling phase, samples are passed through the trees in the same way by going to first or second child of any node, i.e., a left and right node in a tree structure presentation. The samples are passed through the trees depending on their values compared to the selected split-value on the selected feature in the node. When a node without children is reached, the calculation stops, and the path length is given by the number of nodes on the path back to the root node of the tree. The anomaly score is given by the weighted sum of the path lengths through all trees, as further exemplified below.

An anomaly score indicating a degree of anomaly is obtained from ADF application during the detection phase. In some embodiments, the method for detecting anomalies in network data traffic comprises selecting at least one threshold value for detecting anomalies as a minimal value achieving an expected false/positive ratio on the samples used for modelling. In some embodiments, the method for detecting anomalies in network data traffic comprises selecting at least one threshold value for detecting anomalies according to one or more previously observed limits for abnormality.

1.5 The anomaly score includes a normalization constant c(n) that depends on the collected feature samples, i.e., the subsample size n. The expected path-length of a sample x through the forest is defined as:

$$E(h(x)) = \frac{1}{T} \sum_{t=1}^{T} h_t(x) \quad [6]$$

where $h_t(x)$ is the path length when passing sample x through Anomaly Detection Tree t. The path lengths of all used trees are weighted together as an Anomaly Score, AS, using an isolation score, IS, function:

$$IS(x) = 2^{-\frac{E(h(x))}{c(n)}} \quad [7]$$

Scores below 0.3 may indicate normality, whereas scores above 0.3 may be set to indicate a degree of anomaly out of a normal range, but this depends on the normalization constant c(n).

If a sample ends up in a leaf before the bottom node of a tree, this implies that it had an exceptional value for that feature. However, other features on the path may also have contributed to finding the exception by limiting the search to a smaller subspace. A first order contributing node may be defined by a node on the path such that, during training, if the node is removed from the path, the boundaries for selecting the split-value of the isolating feature would be affected directly. Each count can also be weighted by the distance from the bottom node as leaves with shorter paths contribute more to the anomaly score.

Feature Importance I(x,f) for a feature f of a sample x for an ADF model that consists of a forest T of anomaly detection trees $T_1, \ldots, T_N$ is determined as indicated above [Equation 1]. With tree max depth $D_k$, and, the path length $P_k$ of sample x through tree $T_k$, the anomaly detection tree weight $c_k(x,f)$, using a tree specific weight $w_k$, may be determined as:

$$w_k(x) = (D_k - P_k(x)) \quad \text{[Equation 4]}$$

$$c_k(x, f) = \begin{cases} 1, & \text{if } f \text{ contributes to first order isolation of } x \text{ in } T_k \\ 0, & \text{else} \end{cases} \quad \text{[Equation 5]}$$

First order isolation here means that the application of that split-value during training removed some samples that would have altered the split-value of the feature (isolating feature) in the node above the anomaly leaf.

The normalization constant M(x,T) according to [Equation 2] is used in determining feature importance I(x, f) according to [Equation 1], where the most important feature is given a feature importance of 1 as an output of the equation.

The results may be illustrated in a density plot of the most important dimensions according to feature importance superimposing the data point of the anomaly in another colour to accentuate the deviation of the anomaly in this space. When more features are involved, several features can be combined by binning several features according to some suitable interval of the anomaly.

In some embodiments, the method for detecting anomalies in network data traffic comprises activating an alarm based on a comparison between the determined anomaly score and a predetermined threshold. In a typical implementation, an alarm will be activated for every sample that exceeds a predefined threshold for the anomaly score. This alarm can be received by another network function to take appropriate action, for instance, but not limited to alerting device owner and restricting device connectivity.

In some embodiments, the method for detecting anomalies in network data traffic comprises providing the alarm to a network function configured to control anomaly event handling in the network flow from one or more network devices in an external network to one or more network devices in an internal network.

Figure 3:
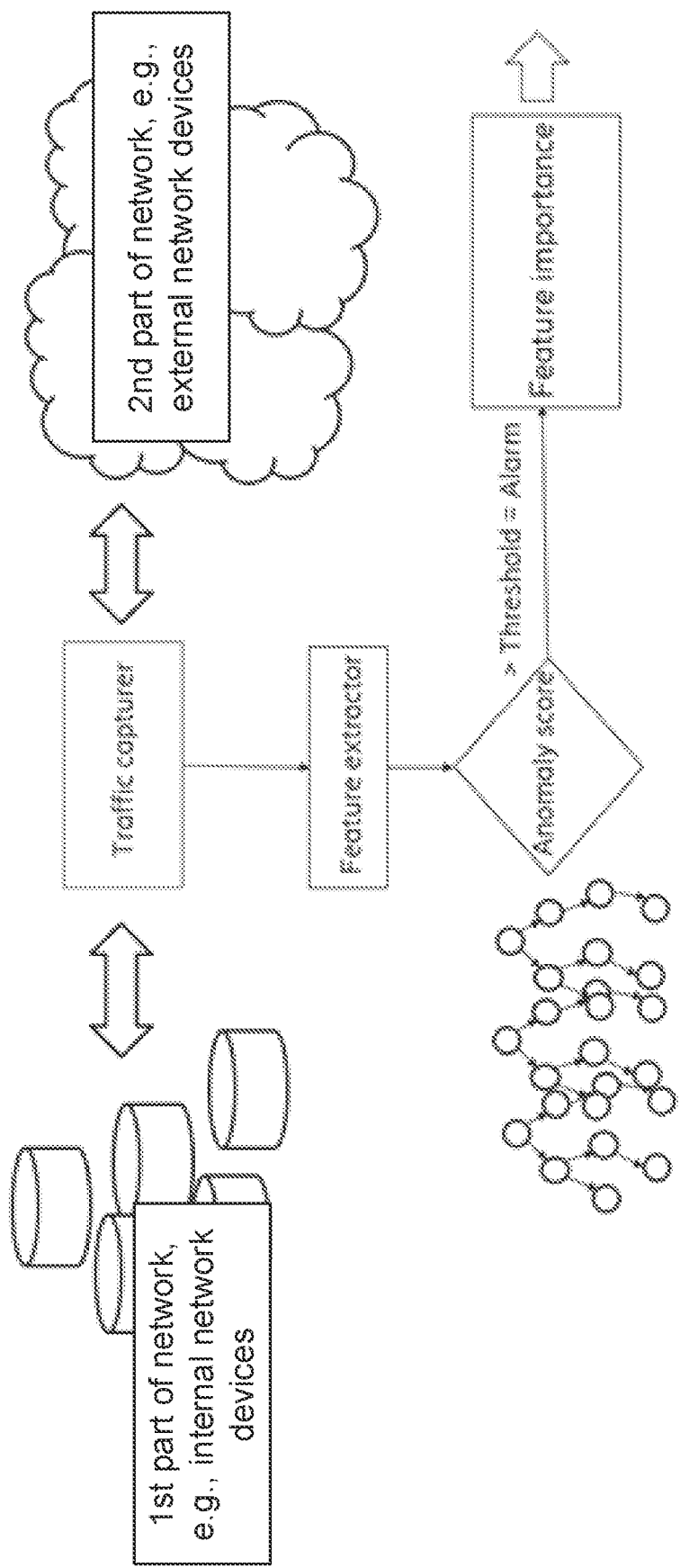
FIG. 3 schematically illustrates aspects of detecting anomalies in network data traffic taking feature importance into consideration.

FIG. 3 schematically illustrates aspects of detecting anomalies in network data traffic taking feature importance into consideration. A traffic capturer is controlled to retrieve at least one network data traffic sample, that is processed by the processing circuitry to determine an anomaly score for each based on the application of the trained anomaly detection model. An alarm is generated when a determined anomaly score surpasses a predetermined threshold. A further assessment of the relevance of the alarm is made by determining feature importance I(x,f) as exemplified above.

Figure 4:
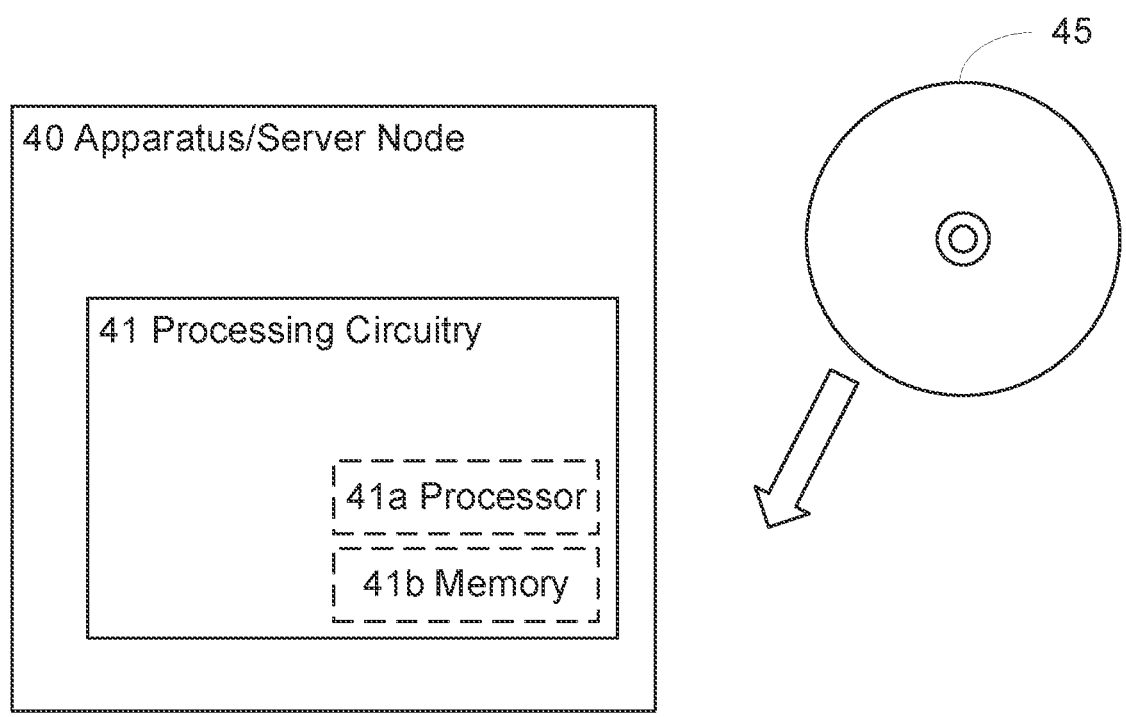
FIG. 4 schematically illustrates aspects of an apparatus for detecting anomalies in network data traffic.

FIG. 4, schematically illustrates aspects of an apparatus 40 for modelling and detecting anomalies in network data traffic, i.e., an apparatus 40 for using an anomaly detection algorithm to create a model for detecting anomalies in network data traffic between devices in a first part of a network and devices in a second part of the network, including devices within a same network. The apparatus may be comprised in a server node.

The apparatus comprises processing circuitry 41 configured to cause collection of feature samples of network data traffic between the first and second part of the network, e.g., by controlling a traffic capturer and training of an anomaly detection model on the collected feature samples using a plurality of AD trees. A computer program, carried on a computer readable medium 45 of a computer program product is loaded into the processing circuitry, e.g., in a memory 41b, and configured to cause execution of the methods when run by the processing circuitry 41, e.g., by the processor 41a.

The training comprises creating the plurality of anomaly detection trees T using a subset of the collected feature samples, each anomaly detection tree comprising subspace selection nodes and anomaly-catching nodes to a predetermined anomaly detection tree depth limit D. Thus, during the training phase features are collected and at the end of the phase they are used to train a forest algorithm. In the detection phase, an anomaly score is calculated.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A computer-implemented method for classifying anomalies of one or more feature-associated anomalies in network data traffic between devices in a first part of a network and devices in a second part of the network, the method comprising:
retrieving at least one network data traffic sample;
determining one or more feature-associated anomaly scores;
determining feature importance for each feature of a feature-associated anomaly score; and classifying one or more anomalies based on the determined one or more feature-associated anomaly scores and the determined feature importance, wherein the classifying comprises ranking the one or more anomalies in relation to one another based on a sum of an anomaly score and feature importance.

2. The method of claim 1, wherein at least one feature is representative of inbound and/or outbound traffic between devices in the first part of the network and devices in the second part of the network.

3. The method of claim 1, wherein the feature-associated anomalies are determined by applying a forest model comprising a collection of detection trees.

4. The method of claim 1, further comprising activating an alarm when the determined anomaly score is above a predetermined anomaly score threshold.

5. The method of claim 4, further comprising activating the alarm when the feature importance surpasses a predetermined feature importance value.

6. The method of claim 5, further comprising adjusting the anomaly score threshold based on the determined feature importance.

7. The method of claim 4, further comprising triggering automatic collection of further information to determine cause of the alarm, wherein automatic collection of further information comprises retrieval of node logs and/or packet tracing.

8. The method of claim 1, further comprising activating at least one feature related limitation in the first part and/or second part of the network based on feature importance, wherein activating the at least one feature related limitation comprises limiting inbound and/or outbound traffic; limiting a number of inbound and/or outbound connections; and limiting use of ports.

9. The method of claim 3, wherein the forest model is an Isolation Forest (IF) model.

10. The method of claim 3, wherein the forest model is an Anomaly Detection Forest (ADF) model.

11. The method of claim 3, wherein the anomaly score is determined using an Isolation Score function IS(x):

$$IS(x) = 2^{-\frac{E(h(x))}{c(n)}}$$

wherein c(n) is a normalization constant that depends on subsample size n and an expected path-length of a sample x through the plurality of AD trees is defined as:

$$E(h(x)) = \frac{1}{T}\sum_{t=1}^{T} h_t(x)$$

where $h_t(x)$ is the path length when passing sample x through Anomaly Detection Tree $_t$.

12. The method of claim 11, further comprising transferring an alarm signal to a network circuitry configured to control anomaly event handling in a network flow from one or more network devices in the first part of the communication network to the second part of the communication network and wherein the first part of the communication network is an external network and the second part of the communication network is an internal network.

13. A non-transitory computer readable medium, having thereon a computer program comprising program instructions, the computer program being loadable into a data processing unit and configured to cause execution of a method when the computer program is run by the data processing unit, wherein the method is for classifying anomalies of one or more feature-associated anomalies in network data traffic between devices in a first part of a network and devices in a second part of the network, and wherein the method comprises:

retrieving at least one network data traffic sample;

determining one or more feature-associated anomaly scores;

determining feature importance for each feature of a feature-associated anomaly score; and classifying one or more anomalies based on the determined one or more feature-associated anomaly scores and the determined feature importance, wherein the classifying comprises ranking the one or more anomalies in relation to one another based on a sum of an anomaly score and feature importance.

14. An apparatus for classifying anomalies in network data traffic between devices in a first part of a network and devices in a second part of the network, the apparatus comprising processing circuitry configured to cause:

retrieval of at least one network data traffic sample;

determination of one or more feature-associated anomaly scores;

determination of feature importance for each feature of a feature-associated anomaly score; and classification of one or more anomalies based on the determined one or more feature-associated anomaly scores and the determined feature importance, wherein the classification comprises ranking the one or more anomalies in relation to one another based on a sum of an anomaly score and feature importance.

* * * * *